US012686418B2

(12) United States Patent
Evans et al.

(10) Patent No.: US 12,686,418 B2
(45) Date of Patent: *Jul. 21, 2026

(54) MAGNETIC TRACTION ASSIST FOR RAILCAR MOVER

(71) Applicant: Trackmobile LLC, LaGrange, GA (US)

(72) Inventors: Robert Evans, LaGrange, GA (US);
Jeffrey Looney, LaGrange, GA (US);
Kevin Grover, Fayettevile, GA (US);
Calvin Wagner, LaGrange, GA (US);
Marco Mattioli, Modena (IT)

(73) Assignee: Trackmobile LLC, LaGrange, GA (US)

( * ) Notice: Subject to any disclaimer, the term of this patent is extended or adjusted under 35 U.S.C. 154(b) by 245 days.

This patent is subject to a terminal disclaimer.

(21) Appl. No.: 18/514,649

(22) Filed: Nov. 20, 2023

(65) Prior Publication Data

US 2024/0343272 A1     Oct. 17, 2024

Related U.S. Application Data

(63) Continuation of application No. 17/064,321, filed on Oct. 6, 2020, now Pat. No. 11,820,406.

(Continued)

(51) Int. Cl.
B61C 15/04          (2006.01)
B60F 1/04           (2006.01)
(Continued)

(52) U.S. Cl.
CPC .............. B61C 15/04 (2013.01); B60F 1/043 (2013.01); B61C 11/00 (2013.01); B61F 1/06 (2013.01); B61J 3/12 (2013.01)

(58) Field of Classification Search
CPC ....... B61C 15/04; B61C 11/00; B61C 11/005; B60F 1/043; B60F 1/00; B60F 1/04; B60L 2200/26; B61J 3/12; B61F 1/06
See application file for complete search history.

(56) References Cited

U.S. PATENT DOCUMENTS

| 1,879,704 | A | * | 9/1932 | McCune | ................. | B61C 15/04 188/165 |
| 1,898,555 | A | * | 2/1933 | McCune | ................... | B60L 3/10 188/165 |

(Continued)

FOREIGN PATENT DOCUMENTS

| CH | 305307 A | 2/1955 | |
| DE | 19940046 A1 | * 11/2000 | ............. B61C 15/04 |

(Continued)

*Primary Examiner* — Cheng Lin
(74) *Attorney, Agent, or Firm* — Arnold & Porter Kaye Scholer LLP

(57) ABSTRACT

A magnetic traction assembly is disclosed for a railcar mover that provides additional downforce to improve traction for a railcar mover when required. The magnetic traction assembly may comprise a frame, an actuator, and a magnetic element positioned underneath a railcar mover. The magnetic element may be lowered to a deployed position, where the magnetic element is positioned near the railroad rails such that the magnetic field from the magnetic element interacts with the railroad rail creating an attraction force that provides additional downforce to the railcar mover.

17 Claims, 11 Drawing Sheets

Related U.S. Application Data

(60) Provisional application No. 62/911,836, filed on Oct. 7, 2019.

(51) Int. Cl.
| | |
|---|---|
| B61C 11/00 | (2006.01) |
| B61F 1/06 | (2006.01) |
| B61J 3/12 | (2006.01) |

(56) References Cited

U.S. PATENT DOCUMENTS

| | | | | | |
|---|---|---|---|---|---|
| 3,653,329 | A | * | 4/1972 | Sasaki | B61C 15/04 |
| | | | | | 303/151 |
| 3,884,156 | A | * | 5/1975 | Ames | B61J 3/12 |
| | | | | | 105/72.2 |
| 3,958,669 | A | * | 5/1976 | Schmied | B61H 7/086 |
| | | | | | 267/74 |
| 4,167,142 | A | * | 9/1979 | Ames | B60F 1/043 |
| | | | | | 105/72.2 |
| 9,616,770 | B2 | | 4/2017 | Nogi et al. | |
| 11,820,406 | B2 | | 11/2023 | Lin et al. | |
| 2017/0043793 | A1 | | 2/2017 | Evans et al. | |

FOREIGN PATENT DOCUMENTS

| | | | | | |
|---|---|---|---|---|---|
| DE | 102014203689 | A1 | * | 9/2015 | ............. B61C 15/04 |
| EP | 2754599 | A1 | | 7/2014 | |
| WO | WO 2021/071852 | | | 4/2021 | |

* cited by examiner

MAGNETIC TRACTION ASSIST FOR RAILCAR MOVER

RELATED APPLICATIONS

This application is a continuation of U.S. Nonprovisional patent application Ser. No. 17/064,321, filed Oct. 6, 2020, which claims priority to U.S. Provisional Patent Application No. 62/911,836, filed Oct. 7, 2019, the contents of each of which is incorporated herein by reference in its entirety.

FIELD OF THE INVENTION

The field of invention for this disclosure relates to a device for improving traction for railcar movers.

BACKGROUND OF THE INVENTION

Railcar movers provide a more efficient way to move railcars around within a rail yard than using a locomotive for such tasks. Being smaller than locomotives, railcar movers can sometimes develop problems getting proper traction. If the traction is improved, the railcar mover may be able to move additional railcars without increasing the size of the power source of the original railcar mover.

Some approaches to increase traction for railcar movers have been to add additional weight or ballast to the railcar mover, but increasing the weight, while improving traction, does not improve efficiency. An apparatus to increase the traction of the railcar mover without appreciably increasing the overall weight of the railcar mover would lead to improved efficiency of the railcar mover.

SUMMARY OF THE INVENTION

Aspects of this disclosure relate to a magnetic traction assembly for use with a railcar mover to increase traction for the railcar mover. The magnetic traction assembly disclosed herein may be positioned underneath a railcar mover and comprise a frame and a magnetic element or plurality of magnetic elements. The frame may be secured to a bottom side of a chassis of the railcar mover and attached to the one or more magnetic elements. The one or more magnetic elements may be positioned a predetermined distance from a top surface of the railroad rails such that a magnetic field from the magnetic element(s) interacts with the railroad rail creating an attraction force that provides additional down-force to the railcar mover, which in turn increases the traction of the railcar mover. In various embodiments, the magnetic traction assembly may further comprise an actuator configured to raise or lower the magnetic element(s) either toward or away from a top surface of a railroad rail. The actuator may be attached to a bottom side of the frame and a top side of the one or more magnetic elements such that the one or more magnetic elements are attached to the frame via the actuator.

Additional aspects of this disclosure may related to a control system for a magnetic traction assembly that comprises one or more physical processors programmed by computer program instructions that, when executed, configure the one or more physical processors to automatically engage or disengage the one or more magnetic elements. In various embodiments, the control system may be configured to obtain data from monitoring device(s) or sensor(s) of the railcar mover and/or magnetic traction assembly related to the performance of the railcar mover or magnetic traction assembly and compare the data to predetermined parameters. Based on the comparison, the control system may be configured to determine whether the magnetic traction assembly is needed to increase traction for the railcar mover. For example, when the control system determines that the magnetic traction assembly is needed to increase traction for the railcar mover, the magnetic traction assembly may be lowered to a predetermined distance and/or energized to increase the downward force on the wheels to improve traction. When the control system determines that additional downforce is no longer needed, power to the one or more magnetic element(s) may be shut off and/or the magnetic traction assembly may be retracted to a storage configuration underneath the railcar mover.

These and other objects, features, and characteristics of the invention disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The present invention is illustrated by way of example and not limited in the accompanying figures in which like reference numerals indicate similar elements and in which.

Figure 1:
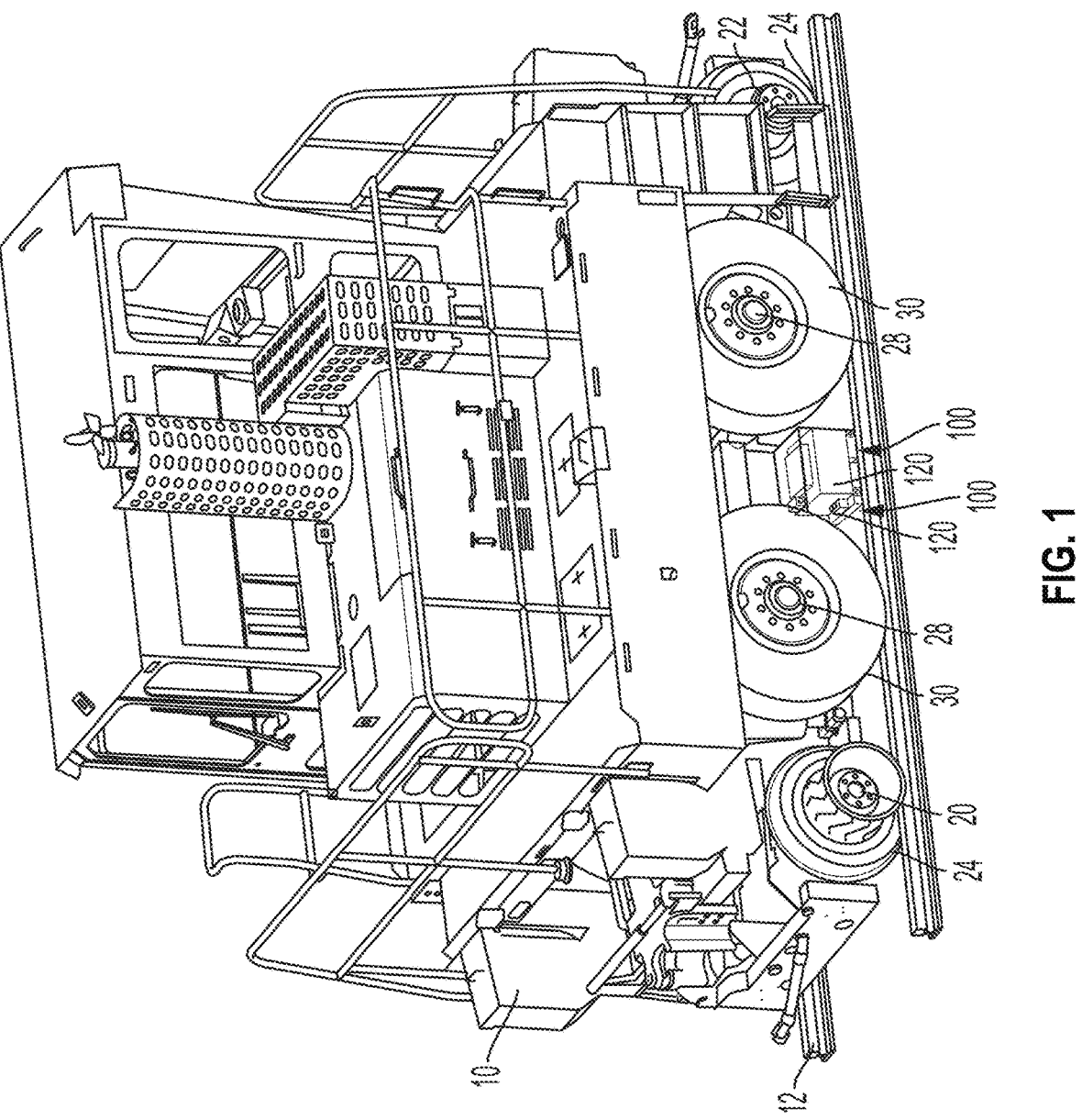
FIG. 1 depicts a perspective view a railcar mover with example magnetic traction assemblies, according to one or more aspects described herein.

These drawings are provided for purposes of illustration only and merely depict typical or example embodiments. These drawings are provided to facilitate the reader's understanding and shall not be considered limiting of the breadth, scope, or applicability of the disclosure. For clarity and ease of illustration, these drawings are not necessarily drawn to scale.

DETAILED DESCRIPTION OF THE INVENTION

Aspects of this disclosure relate to a magnetic traction assembly (or a traction assist assembly) for use with a railcar mover to increase the traction. A magnetic traction assembly for use with a railcar mover may comprise a frame, a magnetic element or plurality of magnetic elements, a power source, a control system, and/or other components. The assembly may be mounted on a bottom side of a railcar mover chassis and stored in a retracted or non-use position when not needed by the railcar mover based upon a predetermined set of parameters. When the magnetic traction assembly is needed to increase traction for the railcar mover, the magnetic traction assembly may be lowered to a predetermined distance and energized to increase the downward force on the wheels to improve traction. In some instances, the magnetic traction assembly may be lowered and energized automatically when a predetermined set of parameters are met, or the assembly may be lowered and energized upon demand by an operator. The additional downforce caused by the magnetic elements increases the frictional force on the wheels, therefore increasing the traction of the railcar mover. The traction assembly may use an actuator to raise or lower the magnetic element(s) either toward or away from a top surface of a railroad rail. The actuator may be driven hydraulically, pneumatically, or using electromechanical actuators.

In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention. Also, while the terms "top," "bottom," "front," "back," "side," "rear," and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention. Also, the reader is advised that the attached drawings are not necessarily drawn to scale.

The following terms are used in this specification, and unless otherwise noted or clear from the context, these terms have the meanings provided below.

"Plurality" indicates any number greater than one, either disjunctively or conjunctively, as necessary, up to an infinite number.

"Substantially constant" when referring to a dimension means that a value is approximately the same and varies no more than +/−5%.

"Integral joining technique" means a technique for joining two pieces so that the two pieces effectively become a single, integral piece, including, but not limited to, irreversible joining techniques, such as welding, brazing, adhesively joining, cementing, or the like, where separation of the joined pieces cannot be accomplished without structural damage thereto. Pieces joined with such a technique are described as "integrally joined."

Figure 2:
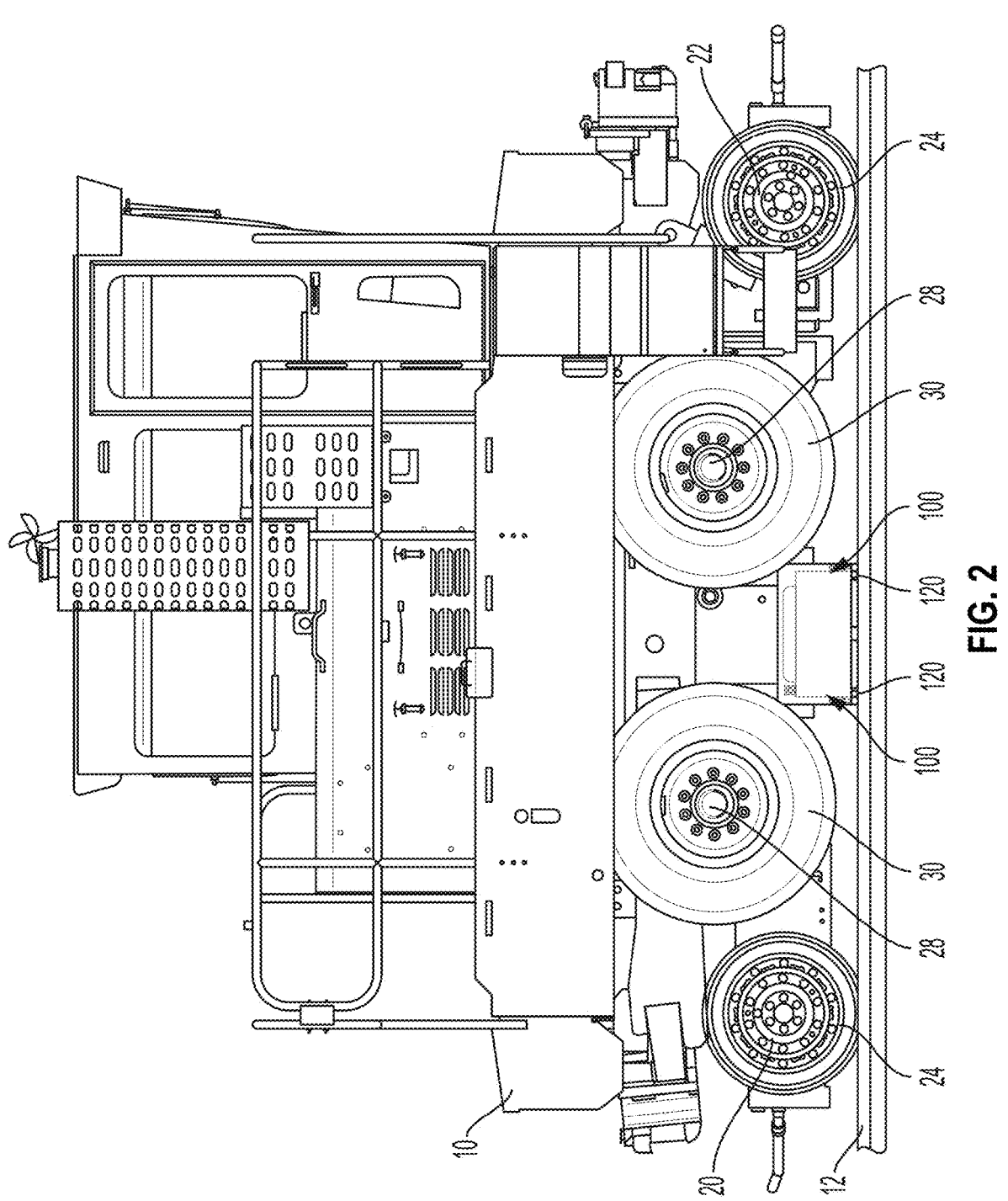
FIG. 2 depicts a side view of a railcar mover with example magnetic traction assemblies of FIG. 1, according to one or more aspects described herein.

FIGS. 1 and 2 depict views of the railcar mover 10 with a magnetic traction assembly 100 attached according to one or more aspects described herein. The railcar mover 10 may include a first rail drive axle assembly 20 and a second drive axle assembly 22 that provide the main traction and movement for the railcar mover 10 when operating on railroad rails 12. The first drive axle assembly 20 and the second rail drive axle assembly 22 may include a set of rail wheel assemblies 24 that engage the railroad rails 12 during operation of the railcar mover 10. The first drive axle assembly 20 and the second drive axle assembly 22 may include a drive motor, wheel assemblies 24, and gearboxes as known and used in the art. The railcar mover 10 may also include one or more pairs of road wheels 30 and road wheel drive axle assemblies 28 that may be utilized for the railcar mover 10 when the railcar mover 10 is moving along the road or ground and not on the rails 12. When the railcar mover 10 is moving off the rails, the road wheels 30 may be lowered below the rail wheels 24 to disengage the rail wheels from the rails 12.

A magnetic traction assembly 100 may be mounted to an underside of the railcar mover 10 and positioned over one of the railroad rails 12 to create an attractive force between a magnetic element 120 of the magnetic traction assembly 100 and the railroad rail 12. The magnetic traction assembly 100 or plurality of magnetic traction assemblies 100 may be mounted to the underside of the chassis of the railcar mover 10 between the two road wheel drive axle assemblies 28. In some embodiments, the magnetic traction assembly 100 may be approximately centered between the road axles 28. As shown in FIGS. 1 and 2, the railcar mover 10 may comprise a pair of magnetic traction assemblies 100 positioned adjacent each other on each side of the railcar 10.

In various embodiments, each magnetic traction assembly 100 may include a frame member 110, one or more magnetic elements 120, a power source 130, an actuator 140, a control system 160, and/or one or more other components. The frame member 110 may have a mounting flange 112 at a first end that attaches to the railcar mover 10. An actuator 140 may connect to the frame 110 at one end and attach to a housing 114 at another end, where the housing 114 secures a magnetic element or plurality of magnetic elements 120. Alternatively, in some embodiments, the actuator 140 may connect to the frame 110 at one end and attach to a magnetic element or plurality of magnetic elements 120 at the other end.

Figure 4:
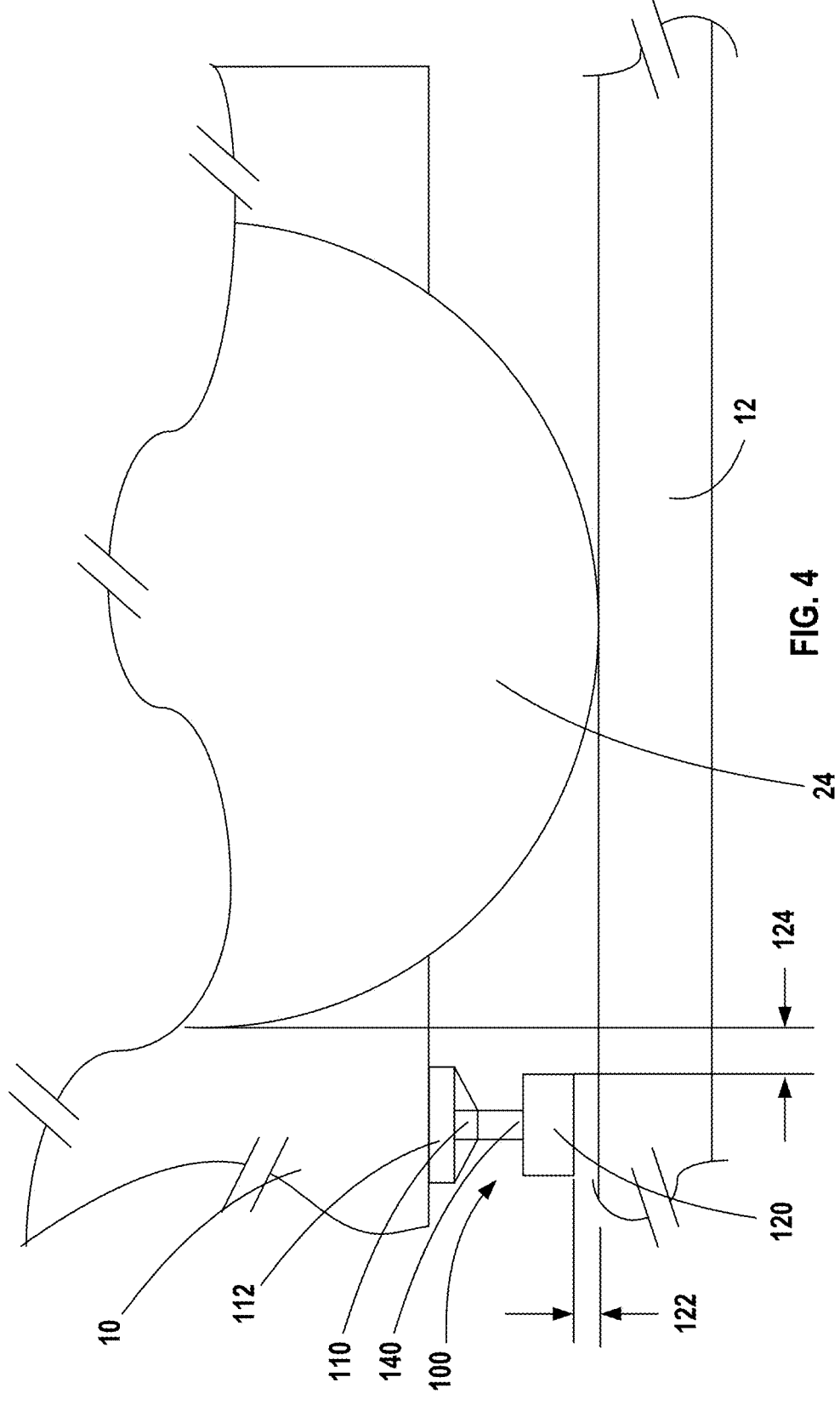
FIG. 4 depicts an enlarged side view of an example magnetic traction assembly on a railcar mover, according to one or more aspects described herein.

The actuator 140 may extend or retract the housing 114 as needed to raise and lower the magnetic element 120 thereby adjusting the distance of the magnetic element 120 and the rails 12. For example, the actuator 140 may lower the magnetic element 120 to a predetermined distance from the rails 12 to allow the magnetic element 120 to be more effective when the magnetic element 120 is energized since the attractive force applied by the magnetic element 120 decreases as the distance increases from the magnetic element 120 to the object. For example, when the magnetic element 120 is lowered toward one of the rails 12 by the actuator 140, the magnetic element 120 may be deployed, or lowered, to a predetermined vertical distance 122 from a top surface of one of the rails 12 as shown in FIG. 4. In various embodiments, the predetermined vertical distance 122 from a pole or an end of the magnetic element 120 to a top surface of one of the rails 12 may be approximately 0.25 inches or within a range of 0.188 inches and 0.50 inches, or within a range of 0.12 inches and 0.75 inches.

Because the rails 12 may be made of steel or other iron-containing alloy, the magnetic field created by the magnetic element 120 creates an attractive force between the magnetic element 120 and the rails 12. For example, when the magnetic element 120 is energized and arranged at the predetermined distance, the magnetic force of each magnetic element 120 may provide an attractive force of up to 5,000 pounds-force onto the railcar mover 10. One skilled in the art will understand that the traction at the rail wheels 24 is a function of the downforce of the vehicle and the coefficient of friction between the rails 12 and the wheels 24. Accordingly, this attractive force increases the amount of downforce on the wheel 24 and thus increases the overall traction at the wheel 24. This increased downforce comes without a significant increase in the overall weight of the railcar mover 10. Alternatively, the magnetic element 120 may be mounted on the frame 110 in a fixed position where the magnetic element is permanently arranged at the predetermined vertical distance 122. Further, in a left-to-right direction, the center of the magnetic element 120 may be substantially aligned with a center of a railroad rail 12.

In addition, a magnetic traction assembly 100 may be arranged on both a left and/or a right side of the railcar mover 10. Each magnetic traction assembly 100 may be controlled independently by control system 160 such that only the selected or desired magnetic traction assemblies may be lowered and energized depending upon the need determined by the control system 160 based upon the conditions the railcar wheels 24 experience.

Figure 3:
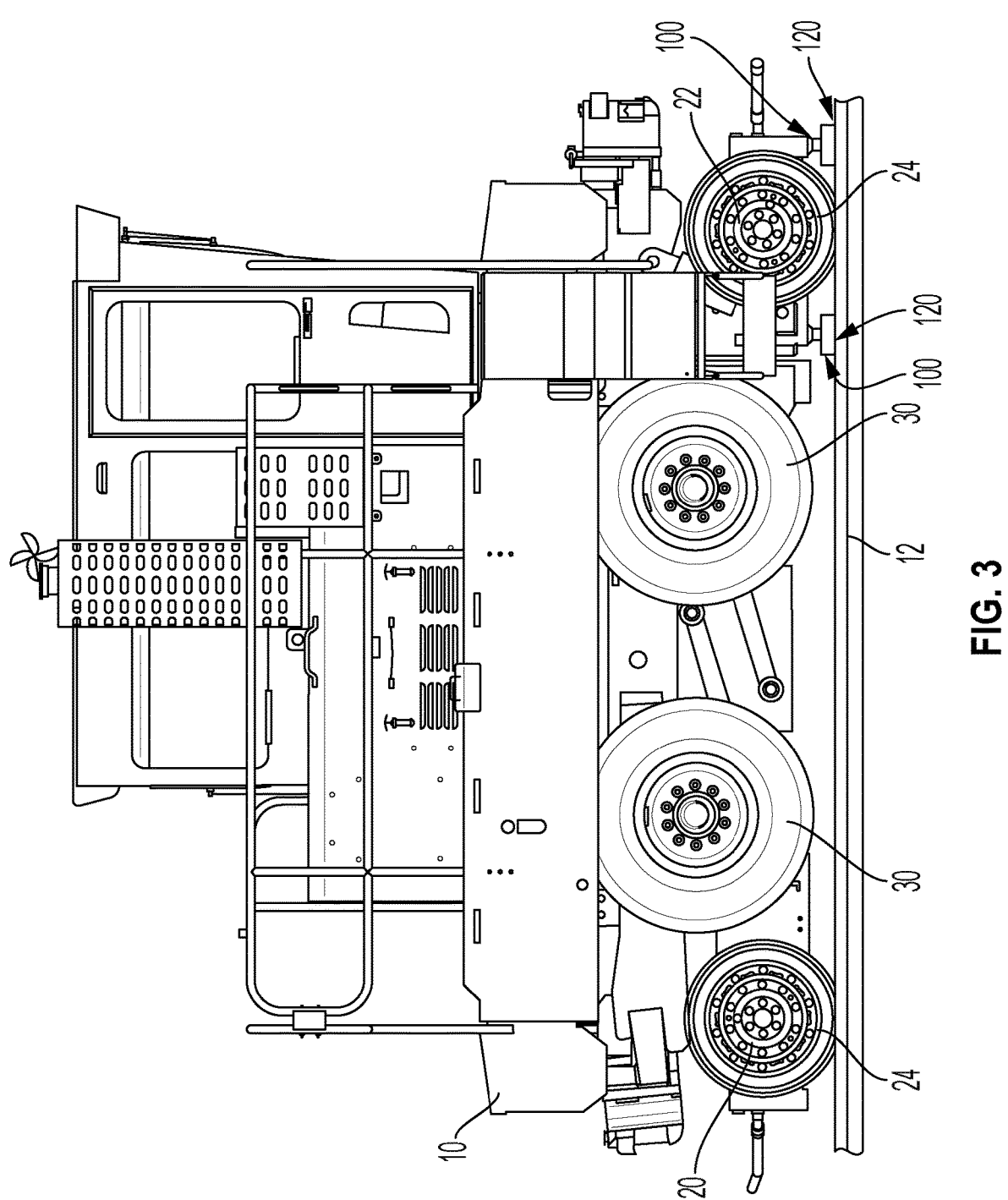
FIG. 3 depicts a side view of a railcar mover with example magnetic traction assemblies, according to one or more aspects described herein.

In another embodiment shown in FIG. 3, the magnetic traction assembly 100 may be mounted to the underside of the chassis of the railcar mover 10 proximate to one of the rail drive axle assemblies 20, 22. The magnetic traction assembly 100 may be arranged on either a forward side or a rear side of the rail drive axle assemblies 20, 22, or a magnetic traction assembly 100 may be arranged on both the forward side and the rear side of the rail drive axle assemblies 20, 22. In one example embodiment, the railcar mover 10 may have up to eight magnetic traction assemblies 100 arranged on both the left and right sides of the railcar mover 10 and positioned on both the forward and rear sides of the railcar wheels 24. The magnetic element 120 may be arranged a predetermined horizontal distance 124 forward or rearward of the outer surface of the wheel 24, as shown in FIG. 4. For example, the predetermined horizontal distance 124 may be defined as minimum horizontal distance from the outer surface of the wheel 24 to an outer edge of the magnetic element 120. In various embodiments, this predetermined horizontal distance may be approximately 1 inch, or within a range of 0.75 inches and 1.5 inches, or within a range of 0.50 inches and 3 inches. Placing the magnetic element 120 close to the wheel 24 may help to focus the additional downforce created by the magnetic element 120 to the wheel region of the railcar mover 10. In other embodiments, such as the embodiments illustrated in FIGS. 1 and 2, the magnetic element 120 may be spaced away from the rail wheels 24 such as between the road wheels 30.

The frame member 110 may have a base or mounting flange 112 at one end that attaches to railcar mover 10 and a bracket or other means to secure the actuator 140 at the opposite end. The magnetic element 120 may be connected directly or indirectly to the actuator 140 such that the magnetic element 120 may be lowered to the active configuration or retracted to the storage configuration. In some embodiments, the frame member 110 may connect to a single magnetic element 120. While in other embodiments, the frame member 110 may support a plurality of magnetic elements 120 such that a portion of the frame member 110 may be lowered by an actuator 140 to position a plurality of magnetic elements 120 into their deployed position. For instance, the frame member 110 may extend substantially across the width of the railcar mover 10 such that when the assembly 100 is in the deployed position, at least one magnetic element 120 may be lowered on both a left side and a right side of the railcar mover 10. The frame member 110 may also be arranged such that when the assembly 100 is in the deployed position, at least one magnetic element 120 may be lowered on both a forward and a rearward position of a railcar wheel 24. The frame member 110 may be a metallic material such as a steel alloy or similar material and may be formed as a unitary piece formed of conventional means such as a casting, forging, or machining process or formed of a plurality of components connected together and integrally joined. Alternatively, the plurality of components forming the frame member 110 may be releasably connected or be connected using a combination of both releasable and integral joining techniques.

In some embodiments, the actuator 140 may arranged to retract and extend the magnetic element 120 as needed. The actuator 140 may lower a housing 114 that secures a magnetic element 120 or may lower the magnetic element 120 directly toward the rails 12. In some embodiments, the actuator 140 may be a linear actuator that can extend or retract as needed. In other embodiments, the actuator 140 may be a rotary actuator combined with a linkage assembly to retract or extend the magnetic element 120 as desired. In addition, the actuator 140 may be activated electrically, pneumatically, or hydraulically. Depending on the type of actuator 140, the system 100 may include any appropriate hardware needed to support the actuator 140 such as compressors or storage tanks for pneumatic or hydraulic actuators or additional electrical power components such as a generator or rechargeable batteries for an electrical actuator.

Figure 7:
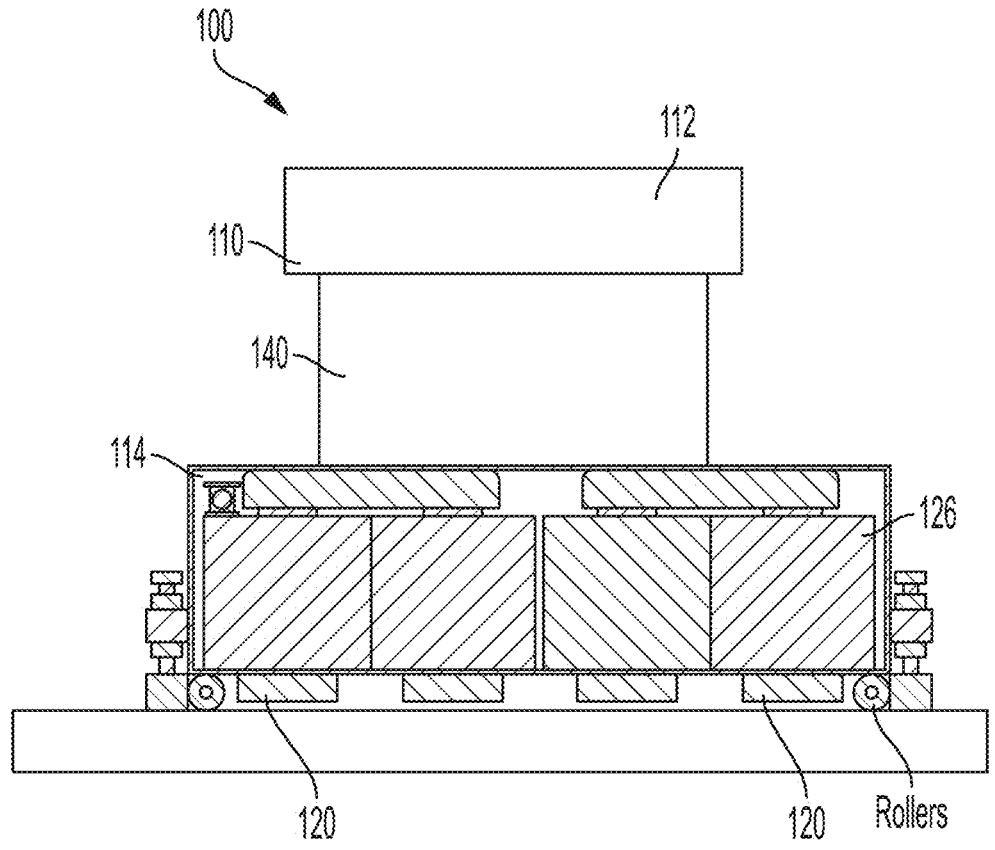
FIG. 7 depicts a side view of an example magnetic traction assembly, according to one or more aspects described herein.
Figure 8:
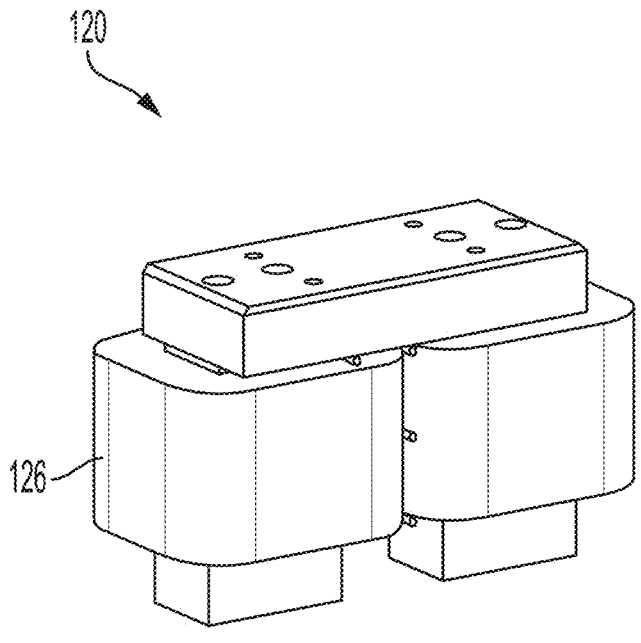
FIG. 8 depicts an interior view of an example magnetic traction assembly, according to one or more aspects described herein.

As described herein, each magnetic traction assembly 100 may comprise one or more magnetic elements 120. In various embodiments, magnetic element 120 may comprise an electromagnet that has a metallic core material with a conductive wire wrapped around it such that when an electrical current is flowing through the wire a magnetic field is formed. In some embodiments, and as shown in FIGS. 7 and 8, each magnetic element 120 may comprise a reverse "U" shaped magnet comprising two coils and configured to be oriented a predetermined distance from a top surface of a railroad rail. Each wire coil 126 may be encapsulated in an insulating material to protect the coils. The insulating material may form an enclosure around the coils that also holds a coolant to help manage any heat generated by the wire coil 126 when they are energized as the attractive force of the electromagnet may be negatively affected if the coil 126 has a significant increased operating temperature. The coolant may be a transformer oil, silicon oil, or other coolant. Each wire coil 126 may use copper wire and may have a weight within a range of 30 lbs. and 40 lbs. In some embodiments, each magnetic traction assembly 100 may comprise a series of magnetic elements 120. For example, in some embodiments, a magnetic traction assembly 100 may comprise a series of reversed "U" shaped magnets enveloped by a one or more coils. In some embodiments, a magnetic traction assembly 100 may comprise a series of reversed "U" shaped metal magnets enveloped by a single long coil, similar to a magnet layout in a magnetic train brake.

Figure 9:
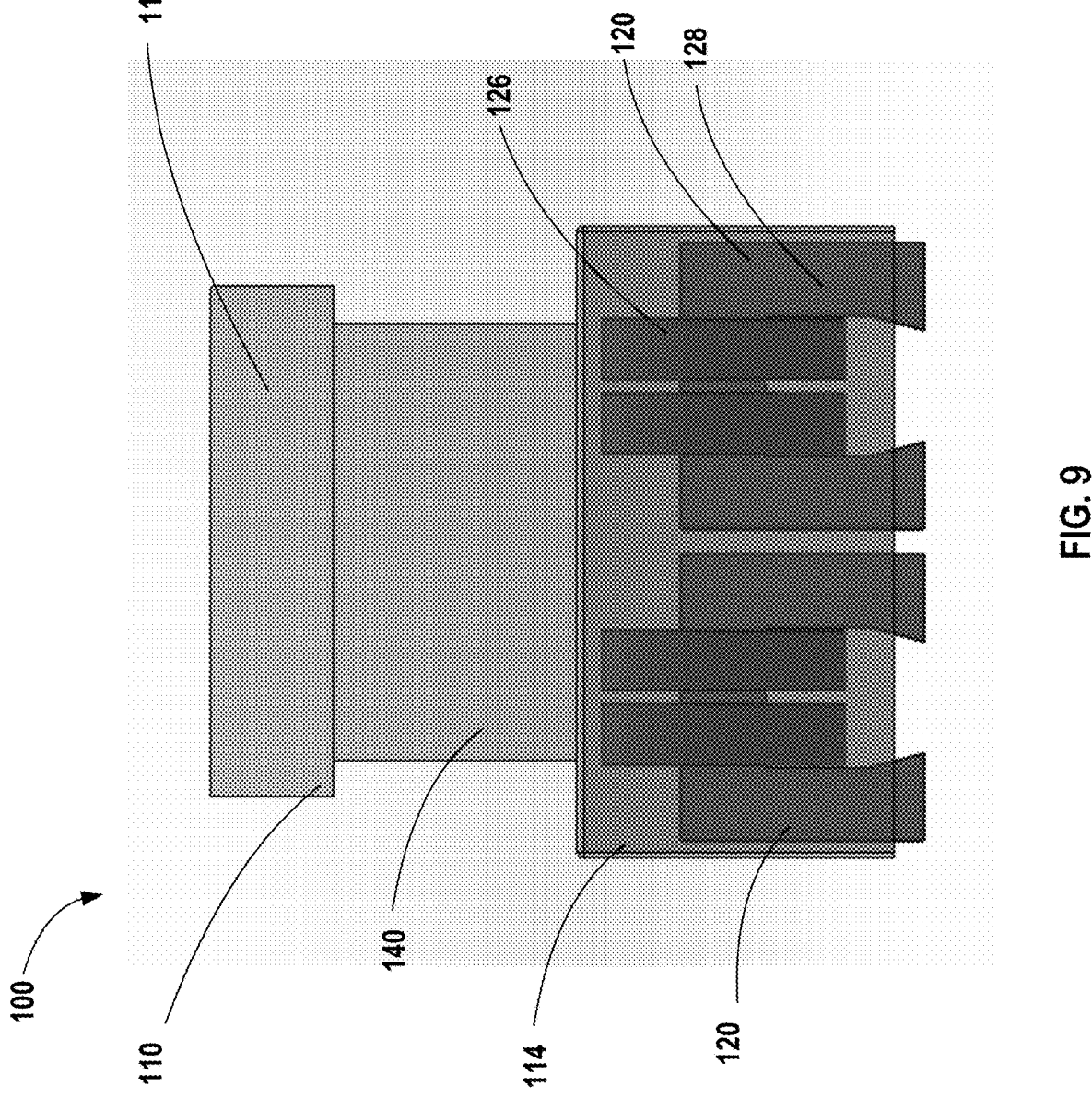
FIG. 9 depicts a side view of an example magnetic traction assembly, according to one or more aspects described herein.
Figure 10:
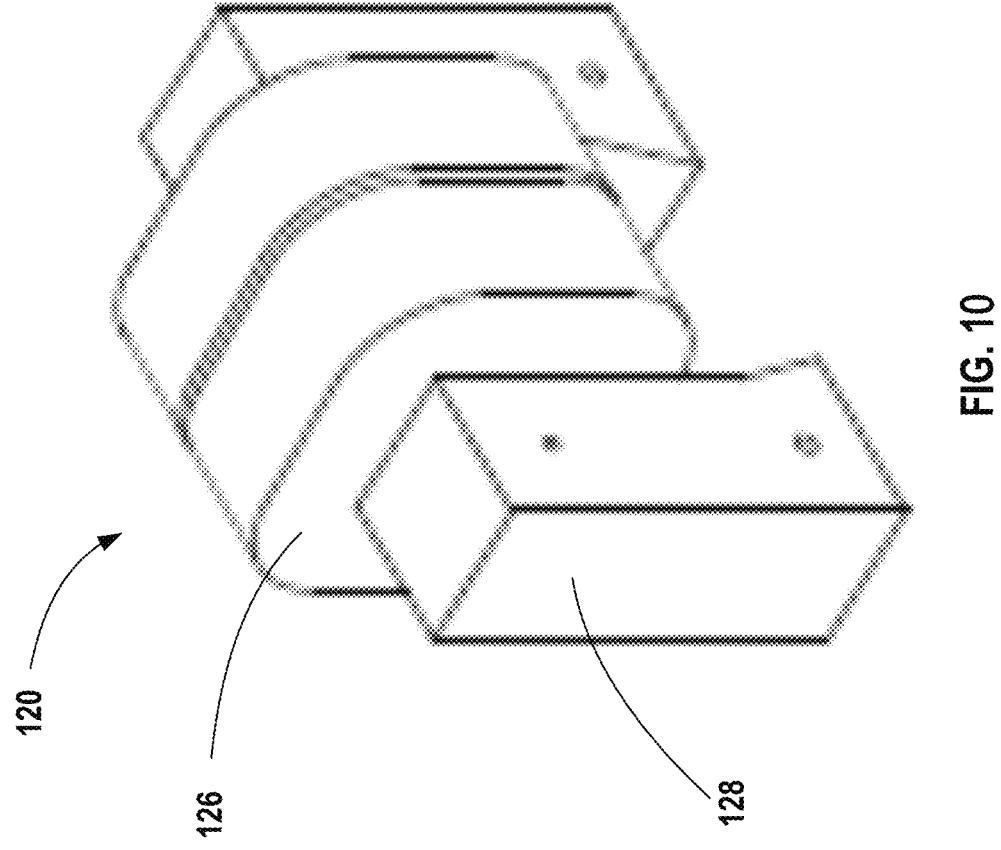
FIG. 10 depicts a perspective view of an example magnetic element, according to one or more aspects described herein.
Figure 11:
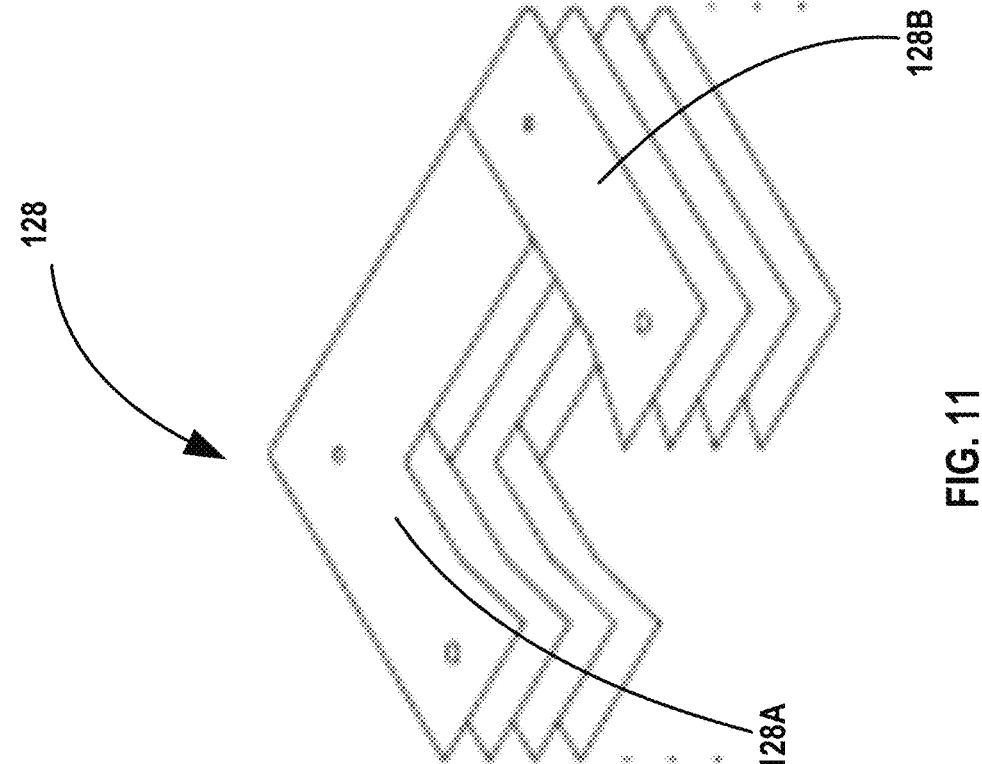
FIG. 11 depicts a perspective view of a lamination stack of the example magnetic element of FIG. 10, according to one or more aspects described herein.

In some embodiments, and as shown in FIGS. 9-11, each magnetic element 120 may comprise a pair of wire coils 126 that are wrapped around a plurality of laminations 128. For example, the laminations 128 may be formed from a steel or other metallic material suitable for stacking to form the base of the electromagnet. In some embodiments, each lamination may be formed from two components (e.g., component 128A and component 128B) that are joined together. One or more other potential configurations of the one or more magnetic elements in the magnetic traction assemblies 100 are also possible.

In some embodiments, the magnetic traction assembly 100 may include one or more components configured to keep the end of a magnetic element 120 at least a minimum distance from the top surface of a railroad rail. For example, the magnetic traction assembly 100 may include one or more rollers 132 or other devices (e.g., such as sliding pads) positioned to keep a magnetic element 120 at least a minimum distance from the top surface of a railroad rail. In various embodiments, the one or more rollers 132 and/or other devices may be configured to regulate and set the minimum distance between the one or more magnetic elements 120 and the top of the rail.

The total pulling force provided by one or more magnetic elements 120 of a magnetic traction assembly 100 may vary based on, for example, the type of track the railcar mover 10 comprising magnetic elements 120 are operating on. In an example embodiment, magnetic traction assembly 100 may provide a total pulling force of up to approximately 5,000 pounds-force. If a railcar mover 10 was arranged with four magnetic elements 120, the magnetic elements 120 may provide a cumulative pulling force of approximately 20,000 pounds-force. The magnetic field from the magnetic element 120 interacts with the rail 12 to produce an attractive force between the magnetic element 120 and the rail 12, thereby increasing the downforce on the railcar mover 10. Each electromagnet may require a power approximately 1,210 Watts or may be within a range of 900 Watts to 1,500 Watts. In some embodiments the electromagnet may be powered from the electrical system of the railcar mover 10. In some embodiments, a separate power source 130 such as an electrical generator or rechargeable battery may be added to the railcar mover 10 to power the electromagnet.

In some embodiments, the magnetic element(s) 120 may comprise one or more other types of magnets. For example, in some embodiments, the magnetic element(s) 120 may comprise a permanent magnet which could operate without an external power system and may operate by simply being raised or lowered into position. Some example types of permanent magnets may be channel magnets or pot magnets.

As discussed above, the magnetic traction assembly 100 may have a housing 114 that secures a magnetic element 120. The housing 114 may be formed from a non-metallic and/or non-magnetic material and act to shield and protect the magnetic element 120 from any damage caused by dust or debris. The housing 114 may also assist to manage and pull heat away from the electromagnet. For example, the housing 114 may have an arrangement of external cooling fins to assist in transferring heat away from the magnetic element 120.

Figure 5:
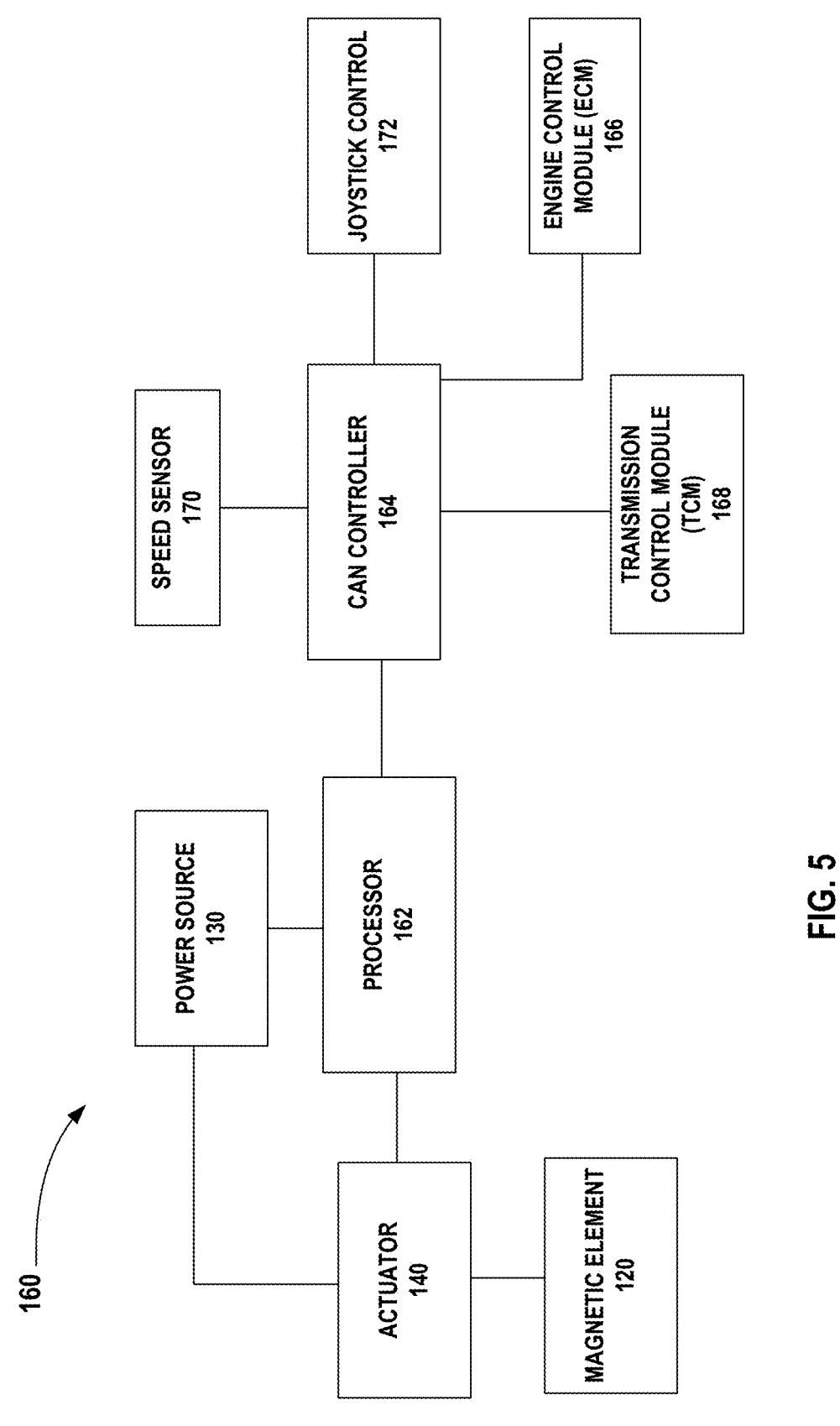
FIG. 5 depicts a block diagram of an example control system of a magnetic traction assembly, according to one or more aspects described herein.
Figure 6:
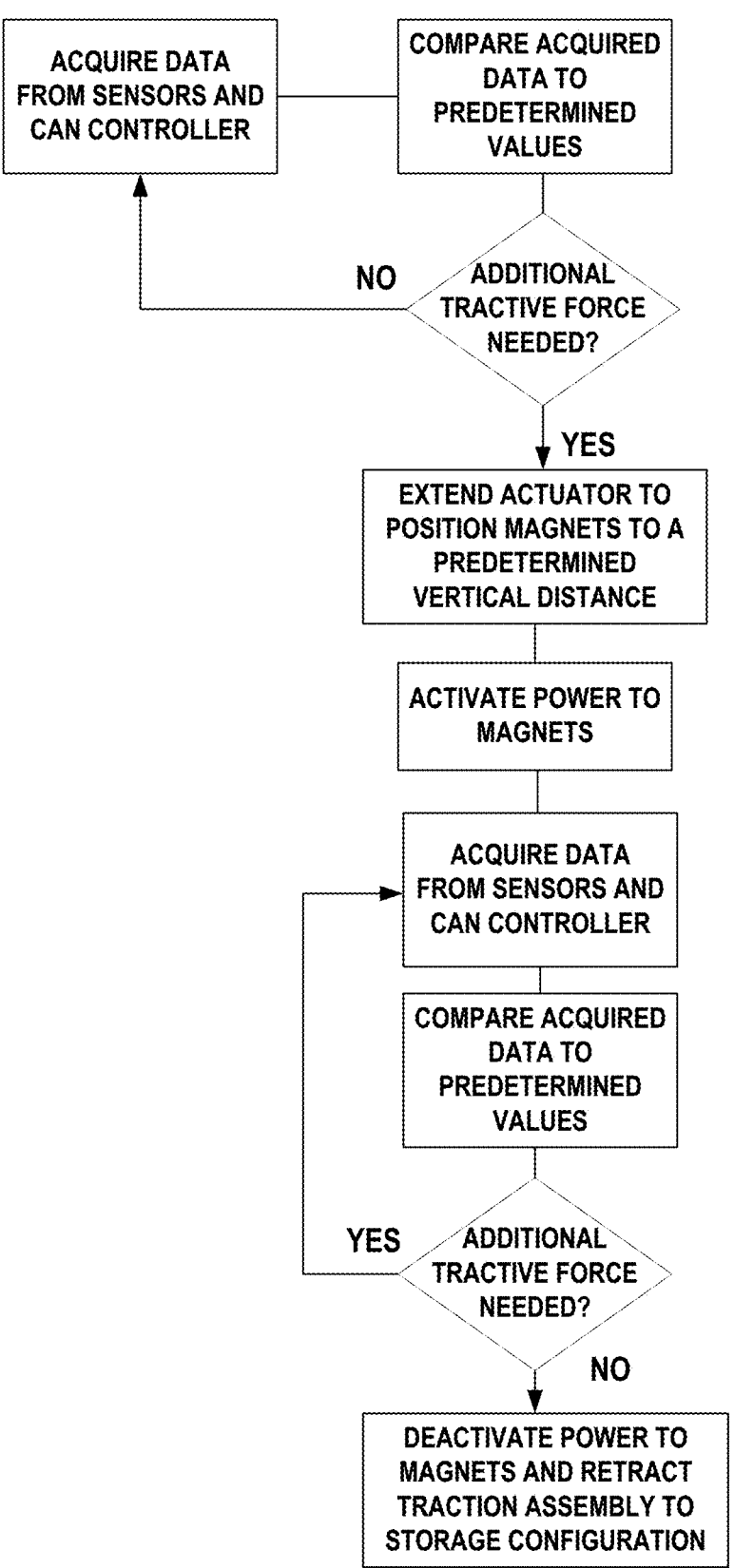
FIG. 6 depicts a flowchart of a process for automatically engaging a magnetic traction assembly, according to one or more aspects described herein.

As shown in FIGS. 5 and 6, the magnetic traction assembly 100 may have an electronic control system 160 to automatically engage the magnetic traction assembly 100 when required. The control system 160 may include a processor 162 that can communicate with the CAN controller 164, which may be an internal communications network within the railcar mover 10 that connects to an engine control module (ECM) 166, a transmission control module (TCM) 168, a speed sensor 170 on the wheels 24 (or alternative wheel speed feedback means), a joystick control 172 used by the railcar mover operator, and/or one or more other components. The CAN controller 164 may allow microcontrollers and other devices within the railcar mover 10 to communicate without a main computer. By communicating with the CAN controller 164, the processor 162 may receive data such as the engine rpm, torque converter rpm, driving torque, braking system and input from the wheels (or other alternative means). As previously described, by comparing the data received about the railcar mover's performance to the predetermined parameters (or values for the predetermined parameters), the processor 162 may determine when to lower and engage the magnetic element 120 into the active configuration. When the magnetic traction assembly 100 is in the active configuration, the processor 162 may continue to monitor the predetermined parameters and adjust the power to the magnetic element 120 to optimize the desired downforce, or if the additional downforce is no longer needed, shut off power to the magnetic element 120 and retract the actuator 140 and move the magnetic element to a storage configuration. Additionally, the magnetic traction assembly 100 may have a temperature sensor that communicates the temperature of the magnetic element 120 to the processor 162. If the processor 162 determines that the temperature is above a predetermined limit, the processor 162 may shut the power off to the magnetic element 120 to prevent damage to the magnetic traction assembly 100 or the railcar mover 10.

The magnetic traction assembly 100 may further comprise a plurality of monitoring devices or sensors that provide information regarding the parameters of various components of the magnetic traction assembly 100. In addition, the electronic control system 160 may include a processor 162 that can communicate with the CAN controller 164 of the of the railcar mover 10 to determine when additional downforce may be necessary. The processor 162 may monitor various performance parameters such as the vehicle ground speed, the current operational mode of the railcar mover, the system diagnostics fault mode, the engine rpm, the torque converter rpm, the driving torque, the joystick position (or operator's input), any braking input, and/or other information. When these performance parameters either individually or in combination satisfy predetermined limits that indicate slippage at one of the wheels 24 and/or that the railcar mover 10 needs additional tractive force (such as starting up pulling a load), the processor 162 may send a signal to instruct the actuator 140 to lower the magnetic element 120 to its deployed position at the predetermined vertical distance 122 and energize the magnetic element 120. The magnetic element 120 may be an electromagnet that is energized from a separate power source 130 or from the electrical system of the railcar mover 10. The amount of magnetic force supplied by the magnetic element 120 may be controlled by the amount of power supplied to the magnetic element 120. In some embodiments, the power supplied to the magnetic element 120 may be substantially constant or variable. For example, the magnetic element 120 may provide a maximum magnetic force when slippage is indicated and reduce its magnetic force as traction improves.

Once the magnetic traction assembly 100 is energized and supplying additional downforce, the processor 162 may continue to monitor the various performance parameters. Once the traction has improved, the processor 162 may determine that when the performance parameters either individually or in combination satisfy predetermined limits that indicate any slippage at one of the wheels has subsided and/or that the railcar mover no longer needs additional tractive force. Upon the performance parameters being satisfied and determining that the traction assembly 100 is no longer necessary, the processor 162 may send a signal to disengage power from the magnetic element 120 and retract the actuator 140 to move the magnetic element 120 to a retracted position.

The control system 160 may also comprise a non-transitory computer readable medium storing computer readable instructions that, when executed by the processor 162, may cause the processor 162 to perform a plurality of instructions to manage the traction assembly 100. For example, the processor 162 may acquire data from the various sensors and modules and compare the acquired data to the predetermined parameters. This first set of acquired data may include at least one or a combination of but not limited to: the vehicle ground speed, the current operational mode of the railcar mover, the system diagnostics fault mode, the engine rpm, the torque converter rpm, the driving torque, the joystick position (or operator's input), and any braking input. As discussed above, the predetermined parameters may include designated target values of at least one or a combination of but not limited to: the vehicle ground speed, the current operational mode of the railcar mover 10, the system diagnostics fault mode, the engine speed, and the torque converter speed. Some examples of target values for the predetermined parameters may be: the vehicle engine speed may be within the full engine range of rpm, the torque converter may be within the full torque converter range of rpm, the input from the traction control wheel may be within a range of 0.1 mph to 3.0 mph or may be within a range of 3.0 to 6.0 mph, and the current vehicle operational mode may be within "Rail Mode" (i.e., when the railcar mover 10 is operating on railroad rails 12 as opposed to when the railcar mover 10 is moving along a road or ground via road wheels 30).

Additionally, when the traction assembly 100 is in the active configuration, the processor 162 may continue to acquire data from the various sensors and compare it to the predetermined parameters. This second set of acquired data may be similar to the first set of acquired data and include at least one or a combination of but not limited to: the vehicle ground speed, the current operational mode of the railcar mover, the system diagnostics fault mode, the vehicle engine speed, the torque converter speed, the driving torque, the available engine torque, and the joystick position (or operator's input). The second set of predetermined parameters may include designated target values of at least one or a combination of but not limited to: the vehicle ground speed, the current operational mode of the railcar mover, the system diagnostics fault mode, the vehicle engine speed, the torque converter speed, the driving torque, the available engine torque, and the joystick position (or operator's input). Some examples of target values for the predetermined parameters may comprise, but not limited to: the vehicle ground may be an adjustable value set by the operator, but may be within a range of 0.1 mph and 4.0 mph, and the calculated tractive effort may be within a range of 60% to 80% of maximum calculated tractive effort to initiate the process to increase power to magnetic element 120. After comparing the second set of data to the second set of predetermined parameters, the processor 162 may determine the proper current to apply to the magnetic element 120 to provide the appropriate downforce to improve the traction or the processor 162 may send instructions to shut off power to the magnetic element 120 and then instruct actuator 140 to retract the magnetic element 120 to a storage configuration underneath the railcar mover 10.

The processor 162 may be utilized to process data received from the sensors and CAN controller 164. The processor 162 may be a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. The processor 162 may also be implemented as a combination of computing devices, e.g., a combination of a DSP and a microprocessor, a plurality of microprocessors, one or more microprocessors in conjunction with a DSP core, or any other such configuration. The one or more implementations described throughout this disclosure may utilize logical blocks, modules, and circuits that may be implemented or performed with a processor.

The processor 162 may be used to implement various aspects and features described herein. As such, the processor 162 may be configured to perform any desired operation on one or more data streams. Further, it will be appreciated that the processor 162 may execute multiple calculations, in parallel or serial, at a very high throughput frequency using the received data. As such, processor 162 may be configured to execute hundreds of thousands, millions, or billions or more calculations per second. Processor 162 may execute coordinate transformations, curve smoothing, noise filtering, outlier removal, amplification, summation processes, and the like. The processor 162 may include a processing unit and system memory to store and execute software instructions.

The present disclosure is disclosed above and in the accompanying drawings with reference to a variety of examples. The purpose served by the disclosure, however, is to provide examples of the various features and concepts related to the disclosure, not to limit the scope of the invention. One skilled in the relevant art will recognize that numerous variations and modifications may be made to the examples described above without departing from the scope of the present disclosure. Thus, the spirit and scope of the invention should be construed broadly as set forth in the appended claims.

What is claimed is:

1. A traction assist assembly for a railcar mover comprising:

one or more magnetic elements attached to a bottom side of a railcar mover, the railcar mover having rail wheels for traveling on railroad rails and road wheels for traveling along a road;

a control system comprising one or more physical processors programmed by one or more computer program instructions that, when executed, configure the one or more physical processors to automatically engage or disengage the one or more magnetic elements, wherein to automatically engage or disengage the one or more magnetic elements, the one or more physical processors are configured to determine a current operational mode of the railcar mover, the current operational mode comprising one of rail mode and road mode, wherein the railcar mover is configured to travel along railroad rails via the rail wheels in rail mode, and wherein the railcar mover is configured to travel along a road via the road wheels in road mode; and wherein the one or more magnetic elements are configured to be positioned over a railroad rail such that, when engaged, the one or more magnetic elements create an attractive force between the one or more magnetic elements and the railroad rail when the railcar mover is traveling on the railroad rail via the rail wheels.

2. The traction assist assembly of claim 1, wherein the one or more magnetic elements comprise one or more electromagnetic elements, and wherein the attractive force is created when the one or more magnetic elements are energized.

3. The traction assist assembly of claim 2, further comprising a power source configured to provide power to the one or more electromagnetic elements.

4. The traction assist assembly of claim 2, wherein the one or more magnetic elements are attached to the bottom side of the railcar mover via a frame secured to a bottom side of a chassis of the railcar mover.

5. The traction assist assembly of claim 4, wherein the one or more magnetic elements are further attached to the bottom side of the railcar mover via an actuator having a first end and a second end opposite the first end, wherein the actuator is attached to a bottom side of the frame at the first end and attached to the one or more magnetic elements at the second end, wherein the actuator is configured to lower the one or more magnetic elements to a predetermined distance from a top surface of the railroad rail.

6. The traction assist assembly of claim 5, further comprising a housing configured to secure the one or more magnetic elements, wherein the actuator is attached to the one or more magnetic elements at the second end via the housing.

7. The traction assist assembly of claim 1, wherein to automatically engage or disengage the one or more magnetic elements, the one or more physical processors are configured to:
    obtain data from one or more monitoring devices or sensors related to performance of the railcar mover and/or the traction assist assembly;
    compare the data related to the performance of the railcar mover to one or more predetermined parameters; and
    determine whether additional traction is needed based on the comparison.

8. The traction assist assembly of claim 7, wherein responsive to a determination that additional traction is needed, the one or more physical processors are configured to:
    cause an actuator to lower the one or more magnetic elements to a predetermined distance from a top surface of the railroad rail.

9. The traction assist assembly of claim 8, wherein responsive to a determination that additional traction is no longer needed, the one or more physical processors are configured to:
    cause the actuator to retract the one or more magnetic elements away from the railroad rail.

10. The traction assist assembly of claim 7, wherein the one or more magnetic elements comprise one or more electromagnetic elements, and wherein the one or more physical processors are further configured to:
    cause the power provided to the one or more electromagnetic elements to be adjusted based on the comparison.

11. The traction assist assembly of claim 7, wherein the one or more physical processors are further configured to:
    cause an actuator to raise or lower the one or more magnetic elements such that the distance between the one or more magnetic elements and a top surface of the railroad rail is adjusted based on the comparison, wherein adjusting the distance between the top surface of the railroad rail alters the attractive force between the one or more magnetic elements and the railroad rail.

12. The traction assist assembly of claim 7, wherein the data obtained from the one or more monitoring devices or sensors indicates one or more of temperature, engine RPM, torque converter RPM, driving torque, input from braking system, and/or input from wheels of the railcar mover.

13. The traction assist assembly of claim 7, wherein the one or more monitoring devices or sensors include a temperature sensor, and the data from the one or more monitoring devices or sensors includes a temperature of the one or more magnetic elements, wherein the one or more physical processors are configured to:
    automatically disengage the one or more magnetic elements from the railroad rail responsive to a determination that the temperature of the one or more magnetic elements exceeds a predetermined limit.

14. The traction assist assembly of claim 1, wherein the one or more magnetic elements comprise a reverse "U" shaped magnet comprising two coils.

15. The traction assist assembly of claim 1, wherein responsive to a determination that the railcar mover is in rail mode, the control system is configured to automatically cause the one or more magnetic elements to engage the railroad rail.

16. The traction assist assembly of claim 1, further comprising one or more rollers separate from the rail wheels and the road wheels that are configured to keep the one or more magnetic elements at least a predetermined distance from a top surface of the railroad rail.

17. The traction assist assembly of claim 1, wherein the road wheels are configured to be lowered to disengage the rail wheels from the railroad rails.

* * * * *